(12) United States Patent
An et al.

(10) Patent No.: US 8,881,162 B2
(45) Date of Patent: Nov. 4, 2014

(54) APPARATUS AND METHOD FOR MANAGING RESOURCES IN CONTAINMENT FRAMEWORK ENVIRONMENT

(75) Inventors: Ho-seok An, Yongin-si (KR);
Chong-mok Park, Songpa-gu (KR);
Seung-bum Chung, Seongnam-si (KR);
Ho-bum Kwon, Gyeonggi-do (KR);
Un-gyo Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1586 days.

(21) Appl. No.: 11/654,611

(22) Filed: Jan. 18, 2007

(65) Prior Publication Data
US 2007/0198723 A1 Aug. 23, 2007

(30) Foreign Application Priority Data

Feb. 21, 2006 (KR) ........................ 10-2006-0016840

(51) Int. Cl.
*G06F 9/46* (2006.01)
*G06F 15/173* (2006.01)
*G06F 12/02* (2006.01)

(52) U.S. Cl.
CPC .................................. *G06F 12/0261* (2013.01)
USPC ........................... 718/104; 718/102; 709/226

(58) Field of Classification Search
USPC ........................................................ 718/104
See application file for complete search history.

(56) References Cited

U.S. PATENT DOCUMENTS

| | | | |
|---|---|---|---|
| 6,058,414 A * | 5/2000 | Manikundalam et al. | .... 718/104 |
| 6,058,423 A * | 5/2000 | Factor | ............................ 709/226 |
| 6,101,525 A | 8/2000 | Hecker | |
| 6,243,716 B1 | 6/2001 | Waldo et al. | |
| 6,275,857 B1 * | 8/2001 | McCartney | .................... 709/226 |
| 6,311,219 B1 * | 10/2001 | Factor | ............................ 709/229 |
| 6,327,596 B1 * | 12/2001 | Wollrath et al. | ....................... 1/1 |
| 6,430,599 B1 | 8/2002 | Baker et al. | |
| 6,453,350 B1 * | 9/2002 | Factor | ............................ 709/226 |

(Continued)

FOREIGN PATENT DOCUMENTS

| | | |
|---|---|---|
| AU | 762637 B2 | 1/2001 |
| CA | 2376857 A1 | 12/2000 |

(Continued)

OTHER PUBLICATIONS

"A Design of Profile Based Generational Garbage Collector in Java", *The Korea Information Science Society*, 1999.

(Continued)

*Primary Examiner* — Abdullah Al Kawsar
(74) *Attorney, Agent, or Firm* — Sughrue Mion, PLLC (57) ABSTRACT

Provided is an apparatus and method for managing resources in a containment framework environment, more particularly, an apparatus and method for managing resource allocation and resource de-allocation in a containment framework environment including a plurality of applications having life cycles. The apparatus includes an identifier generating unit generating a unique identifier of an application to which a predetermined resource is allocated; an application managing unit binding or unbinding the resource to or from the unique identifier; a resource managing unit that increases a counter for the use of the resource when the binding is established and decreases the counter for the use of the resource when the resource is unbound from the unique identifier; and a resource de-allocating unit de-allocating the resource when the counter is 0.

11 Claims, 7 Drawing Sheets

(56) References Cited

U.S. PATENT DOCUMENTS

| | | | |
|---|---|---|---|
| 6,496,864 B1* | 12/2002 | McCartney | 709/226 |
| 6,505,229 B1* | 1/2003 | Turner et al. | 718/107 |
| 6,738,875 B1 | 5/2004 | Wang | |
| 6,886,085 B1 | 4/2005 | Shuf et al. | |
| 6,910,210 B1* | 6/2005 | Chew | 718/103 |
| 7,103,625 B1* | 9/2006 | Hipp et al. | 709/201 |
| 7,103,665 B2* | 9/2006 | Shinohara et al. | 709/226 |
| 7,257,812 B1* | 8/2007 | Calder et al. | 718/100 |
| 7,565,656 B2* | 7/2009 | Yamasaki et al. | 718/104 |
| 2002/0002576 A1* | 1/2002 | Wollrath et al. | 709/1 |
| 2004/0098724 A1* | 5/2004 | Demsey et al. | 718/104 |
| 2005/0010924 A1* | 1/2005 | Hipp et al. | 718/104 |

FOREIGN PATENT DOCUMENTS

| | | |
|---|---|---|
| EP | 1192540 A0 | 12/2000 |
| JP | 11-045187 A | 2/1999 |
| JP | 2003-502730 A | 1/2003 |
| KR | 102005066277 A | 6/2005 |
| WO | 00/77633 A1 | 12/2000 |

OTHER PUBLICATIONS

"A Design of Garbage Collector for Java-Based Embedded Systems", *The Korea Information Science Society*, 1999.

European Search Report dated Jun. 27, 2007 for Application No. 07102080.4-2211.

JSRs: Java Specification Request, Jan. 19, 2006, pp. 1-6, XP002437714 Internet Article.

Richard Jones, Rafael Lins, "Garbage Collection: Algorithms for Automatic Dynamic Memory Management", 1996, WILEY, XP002437979, pp. 19-20.

Communication dated Jan. 31, 2012, issued by the Japanese Patent Office in counterpart Japanese Application No. 2007-34885.

* cited by examiner

| APPLICATION IDENTIFIER | RESOURCE IDENTIFIER | RESOURCE USAGE |
|---|---|---|
| 0x0001 | FILE 1 | 1 |
| 0x0001 | FILE 2 | 0 |
| 0x0001 | FILE 3 | 1 |
| 0x0002 | FILE 4 | 1 |
| 0x0002 | FILE 5 | 0 |
| 0x0002 | FILE 6 | 0 |

APPARATUS AND METHOD FOR MANAGING RESOURCES IN CONTAINMENT FRAMEWORK ENVIRONMENT

CROSS REFERENCE TO RELATED APPLICATION

This application claims priority from Korean Patent Application No. 10-2006-0016840 filed on Feb. 21, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to managing resources in a containment framework environment, more specifically, to managing the allocation and de-allocation of resources in a containment framework environment including a plurality of applications having life cycles.

2. Description of the Related Art

Java is an object-oriented programming language that platform-independently executes a source code. Here, a platform means a software environment, such as hardware or an operating system, on which programs are executed. Java source code is compiled into Java byte code by a Java compiler and the Java byte code is executed by Java virtual machines that have been formatted on various hardware-based platforms.

Figure 1:
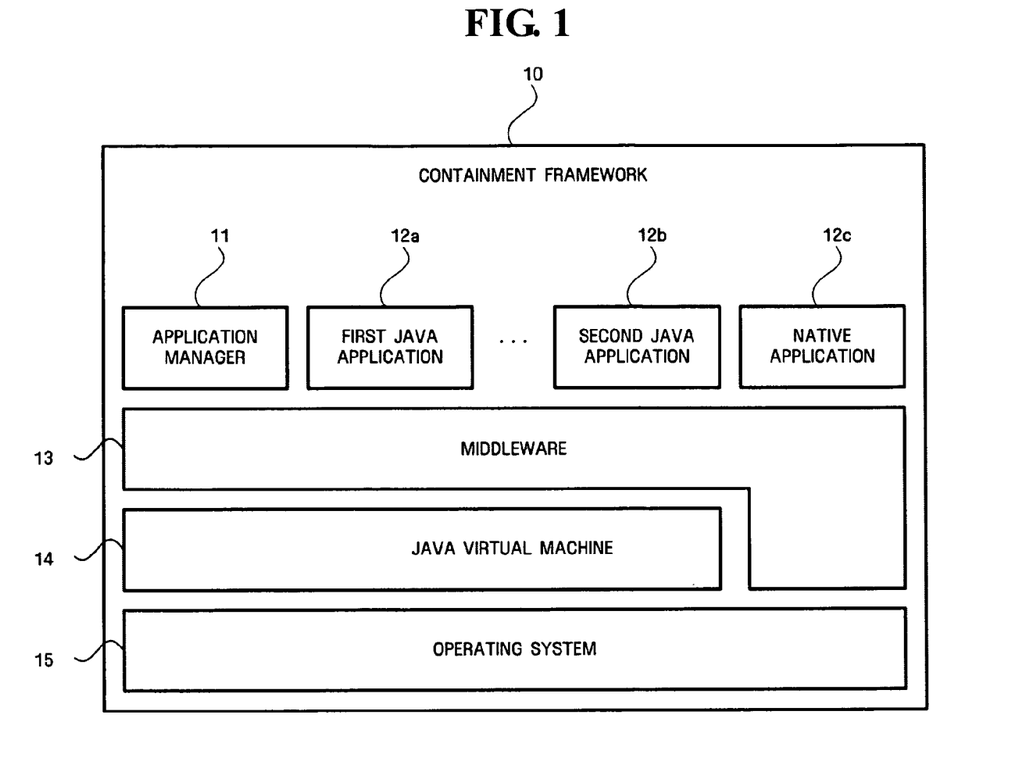
FIG. 1 is a block diagram showing a containment framework according to the related art.

FIG. 1 is a block diagram showing the architecture of a containment framework according to the related art. A containment framework 10 includes an application manager 11, applications 12a, 12b, and 12c, middleware 13, a Java virtual machine 14, and an operating system 15.

Here, the applications 12a and 12b are Java applications, and the application 12c is a native application.

The application manager 11 manages life cycles of the applications by changing the states of the applications. For example, the application manager 11 manages the operation of the applications through the middleware 13, such as open cable application platform (OCAP) or advanced open cable application platform (ACAP).

The Java virtual machine 14 has classes included in the applications stored in a memory, converts an execution code of the class into a command code of the operating system 15, and manages the resources allocated to the applications.

For resource management, the Java virtual machine 14 has a garbage collector. The garbage collector finds out garbage objects (objects that do not use resources), and returns the used heap resources to the operating system such that the heap resources can be reused by other applications.

That is, resource management on a Java platform is performed by the garbage collector, which manages the allocation or de-allocation of resource to an object depending on whether to refer to the object. However, when a plurality of applications are executed on a framework with a life cycle, such as a containment framework, unless work for resource de-allocation is satisfactorily performed, even after the applications are shut down, the garbage collector does not check whether the object is alive, and thus, resource de-allocation may not be appropriately performed.

For this reason, many researches on resource de-allocation by the garbage collector have been conducted. Most research propose a resource managing method based on a specific framework, but do not propose a resource managing method executed on a general containment framework when an application is shut down.

U.S. Pat. No. 6,738,875 discloses a Write-Watch mechanism that is used for garbage collection and has a memory manager. When an API call, such as garbage collection, occurs, the memory manager checks which virtual address has been modified, and manages a memory separately from garbage collection.

However, U.S. Pat. No. 6,738,875 discloses only a method of de-allocating resources on a general framework, such as a memory resource, but does not disclose a method of de-allocating resources on a containment framework having a life cycle.

Therefore, a method of effectively de-allocating resources of an application that is shut down in a containment framework environment in which a plurality of applications having life cycles can operate is needed.

SUMMARY OF THE INVENTION

An aspect of the present invention is to manage resources on the whole framework using information on resource allocation and de-allocation for each application in a containment framework environment including a plurality of applications having life cycles.

Aspects of the present invention are not limited to those mentioned above, and other aspects of the present invention will be apparently understood by those skilled in the art through the following description.

According to an aspect of the present invention, there is provided an apparatus for managing resources in a containment framework environment, the apparatus including an identifier generating unit generating a unique identifier of an application to which a predetermined resource is allocated; an application managing unit binding or unbinding the resource to or from the unique identifier; a resource managing unit that increases a counter for the use of the resource when the binding is established and decreases the counter for the use of the resource when the resource is unbound from the unique identifier; and a resource de-allocating unit de-allocating the resource when the counter is 0.

According to another aspect of the present invention, there is provided a method of managing resources in a containment framework environment, the method including generating a unique identifier of an application to which a predetermined resource is allocated; binding or unbinding the resource to or form the unique identifier; increasing a counter for the use of the resource when the binding is established and decreasing the counter for the use of the resource when the resource is unbound from the unique identifier; and de-allocating the resource when the counter is 0.

Details of other exemplary embodiments are included in the specification and the accompanying drawings.

BRIEF DESCRIPTION OF THE DRAWINGS

The above and other features and aspects of the present invention will become more apparent by describing in detail exemplary embodiments thereof with reference to the attached drawings, in which.

DESCRIPTION OF THE EXEMPLARY EMBODIMENTS

Aspects and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the invention will be described with reference to the accompanying drawings.

Figure 2:
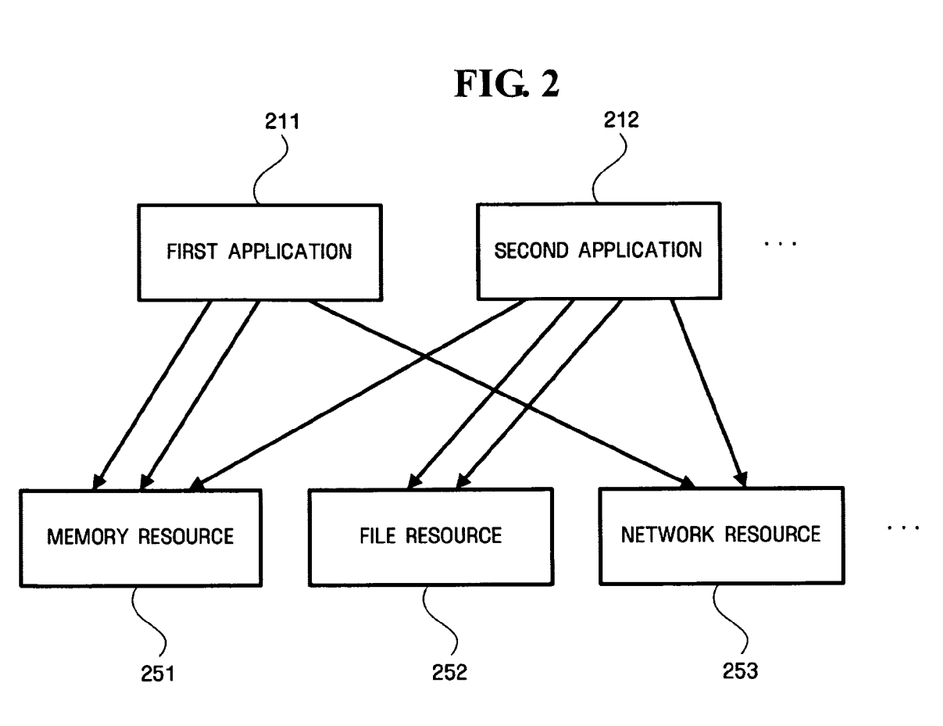
FIG. 2 is a conceptual diagram showing a case when resources are used by an application according to an exemplary embodiment of the invention.

FIG. 2 is a conceptual diagram showing a case in which resources are used by an application according to an exemplary embodiment of the invention.

An apparatus for managing resources in a containment framework environment (hereinafter, referred to as a resource managing apparatus) can use resource using one or more applications 211 and 212. Here, the applications 211 and 212 may be Java applications having life cycles in a containment framework environment, for example, Xlet, middlelet, or applet.

The resources used by each of the applications 211 and 212 may be at least one of a memory resource 251, a file resource 252, and a network resource 253.

FIG. 2 shows a case in which a first application 211 uses two memory resources 251 and one network resource 253 and a second application 212 uses one memory resource 251, two file resources 252, and one network resource 253.

That is, each of the applications 211 and 212 may use a plurality of different resources, or it may use a plurality of resources of the same type. One application can use a resource that another application is using.

While applications may be created and destroyed whenever necessary, unless resources occupied by a specific application is de-allocated as the specific application is destroyed, applications created thereafter may not use the resources. The resource managing apparatus according to an exemplary embodiment of the invention maintains information on the usage of resources allocated to individual applications and information on whether resources have been de-allocated. When a specific application is destroyed, the resource managing apparatus de-allocates all the resources allocated to the specific application on the basis of the information. In other words, the resource managing apparatus unbinds an application from resources allocated to the application so as to allow any application created thereafter to use the corresponding resources. For example, when operating in a Java environment, the resource managing apparatus uses a modified Java virtual machine to force a garbage collector to collect different Java objects, thereby making resources reusable.

In FIG. 2, when the first application 211 is shut down, the resource managing apparatus unbinds the first application 211 from the resources, that is, two memory resources 251 and one network resource 253 allocated to the first application, and then returns assignment of the resources to the operating system. In this way, the resource managing apparatus performs the de-allocation of the resources allocated to the first application 211.

After an application using a specific resource is shut down, even though the application continues to use the specific resource, the resource managing apparatus can de-allocate the specific resource.

Figure 3:
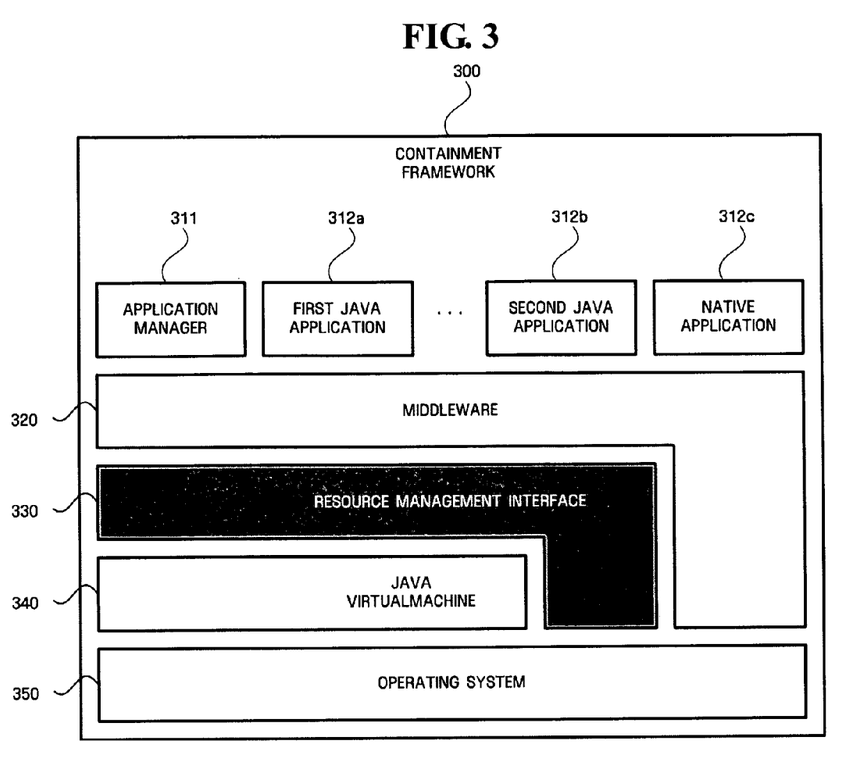
FIG. 3 is a block diagram showing the structure of a containment framework according to an exemplary embodiment of the invention.

FIG. 3 is a block diagram showing the architecture of a containment framework according to an exemplary embodiment of the invention. As shown in FIG. 3, a containment framework 300 includes an application manager 311, applications 312a, 312b, and 312c, middleware 320, a resource management interface 330, a Java virtual machine 340, and an operating system 350.

Here, the applications 312a and 312b are Java applications, and the application 312c is a native application.

The application manager 311 manages the life cycles of the applications by changing the states of the applications. Here, the application manage 311 can manage the operation of the applications through the middleware 320, such as OCAP or ACP.

The Java virtual machine 340 has classes included in the applications stored in a memory, converts an execution code of the class into a command code of the operating system 350, and manages the resources allocated to the applications.

In this case, the resource management interface 330 can mange resources using the modified Java virtual machine 340. More specifically, the resource management interface 330 manages resource allocation and de-allocation on a containment framework 300 having a life cycle. When an application is shut down, the resource management interface 330 forcibly de-allocates the resources allocated to the corresponding application. The resource management interface 330 will be described below in detail with reference to FIG. 4.

Figure 4:
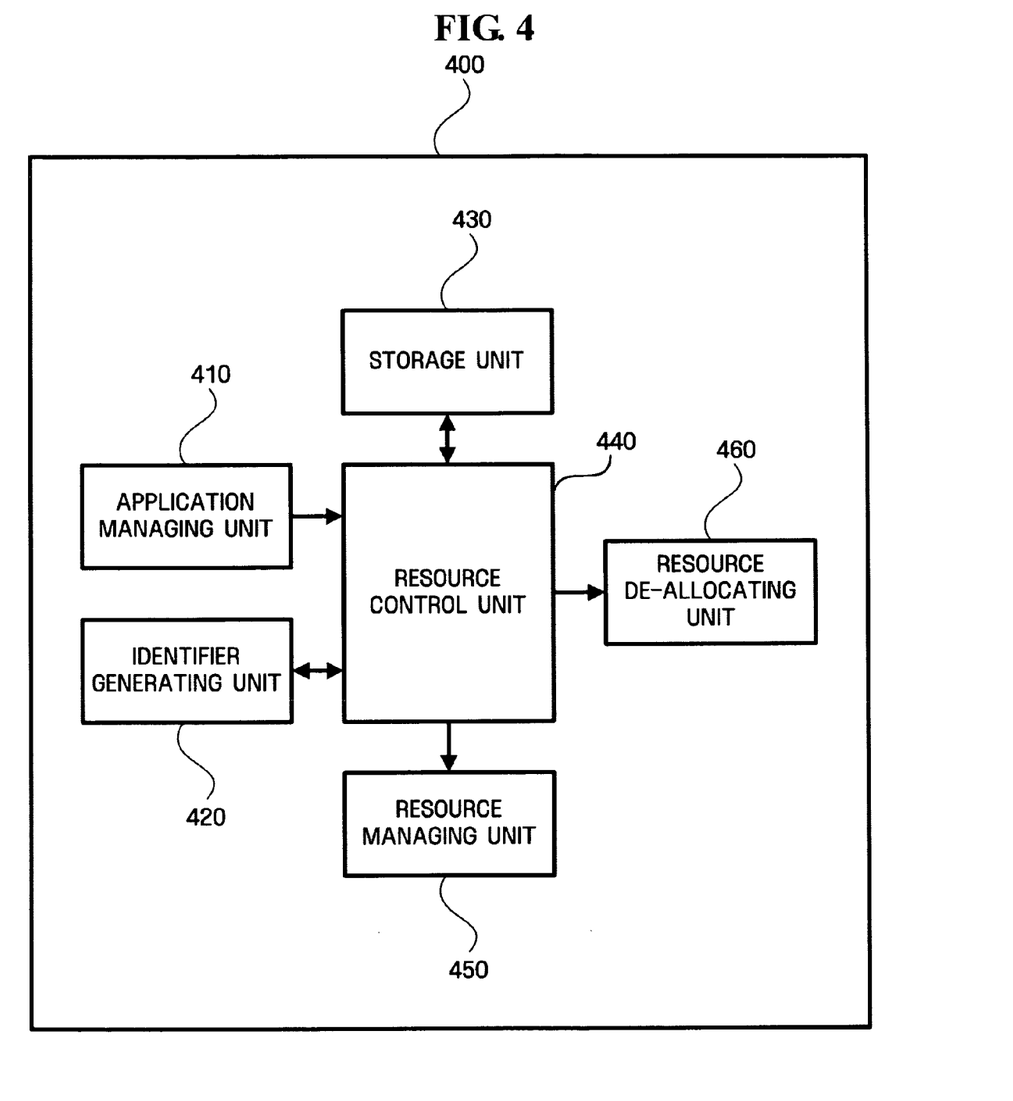
FIG. 4 is a block diagram showing an apparatus for managing resources under a containment framework environment according to an exemplary embodiment of the invention.

FIG. 4 is a block diagram showing an apparatus for managing resources in a containment framework environment according to an exemplary embodiment of the invention. As shown in FIG. 4, a resource managing apparatus 400 includes an application managing unit 410, an identifier generating unit 420, a storage unit 430, a resource control unit 440, a resource managing unit 450, and a resource de-allocating unit 460.

The identifier generating unit 420 generates a unique identifier of an application to which a predetermined resource is allocated (hereinafter, referred to as an application identifier). The resource may include at least one of a memory resource, a file resource, and a network resource. That is, an application can use at least one of the memory resource, the file resource, and the network resource. Also, an application can use a plurality of resources of the same type. Here, the application may be a Java application having a predetermined life cycle in a containment framework environment, such as Xlet, middlelet, or applet.

Further, the identifier generating unit 420 may generate application identifiers using thread identifiers of applications, or it may generate application identifiers using application registration orders.

The application managing unit 410 manages the connection between application identifiers and resources. That is, when an application uses a specific resource, the application managing unit 410 binds the application identifier to the specific resource. Then, when the use of the specific resource is completed, the application managing unit 410 unbinds the application identifier from the specific resource.

Also, the application managing unit 410 may initialize an application and change the state of an application. The application managing unit 410 loads an initialized application in a memory. When the loaded application pauses, the application managing unit 410 starts the paused application. When the execution of the application is completed, the application managing unit 410 destroys the corresponding application. Here, the application manager may change the state of the executed application into a paused state.

The resource managing unit 450 increases a counter for the use of a resource every time the application managing unit 410 performs binding, and decreases the counter for the use of a resource every time the application managing unit 410 performs unbinding. As described above, the resource managing apparatus 400 uses resources including the memory resources, the file resources, and the network resources, and thus may include a memory resource managing unit, a file resource managing file, and a network resource managing unit. That is, the resource managing unit 450 performs resource management according to the type of applications and performs management according to the type of resources.

Here, the resource managing unit 450 increases or decreases a counter for all resources allocated to one application. For example, when one memory resource and three file resources are allocated to a specific application, the resource managing unit 450 increases or decreases a counter for the four resources allocated to the corresponding application regardless of the types of the resources.

Meanwhile, the resource managing apparatus 400 may execute a plurality of applications. In this case, the resource managing unit 450 increases or decreases a counter for the resource allocated to each of the applications. For example, when a first application and a second application are loaded in the memory by the application managing unit 410, the resource managing unit 450 separately manages a counter for the resources allocated to the first application and a counter for the resources allocated to the second application.

Resource allocation to an application and resource de-allocation may be performed in real time, and thus the resource managing unit 450 may manage a counter for resources in real time.

The storage unit 430 stores a table in which the application identifiers and resources are associated with each other (hereinafter, referred to as a resource table). Content included in the resource table may be updated according to the allocation and de-allocation of resources.

The storage unit 430 is a module, such as a compact flash (CF) card, a secure digital (SD) card, a smart media (SM) card, a multimedia card (MMC), or a memory stick, to which or from which information can be input or output. The storage unit 430 may be provided inside the resource managing apparatus 400, or it may be provided in a separate device.

The resource control unit 440 makes up and updates the resource table. That is, when an application is initialized by the application managing unit 410, the resource control unit 440 confirms resources allocated to the application and includes the confirmed resources in the resource table together with the application identifiers and the types of resources.

Also, the resource control unit 440 generally controls the identifier generating unit 420, the application managing unit 410, the storage unit 430, the resource managing unit 450, the resource de-allocating unit 460, and the resource managing apparatus 400.

When the counter for the use of a resource managed by the resource managing unit 450 is 0, the resource de-allocating unit 460 de-allocates the corresponding resources. In other words, the resource de-allocating unit 460 releases the occupation of the resources by the corresponding application. In a Java environment, a garbage collector may serve as the resource allocating unit 460.

Figure 5:
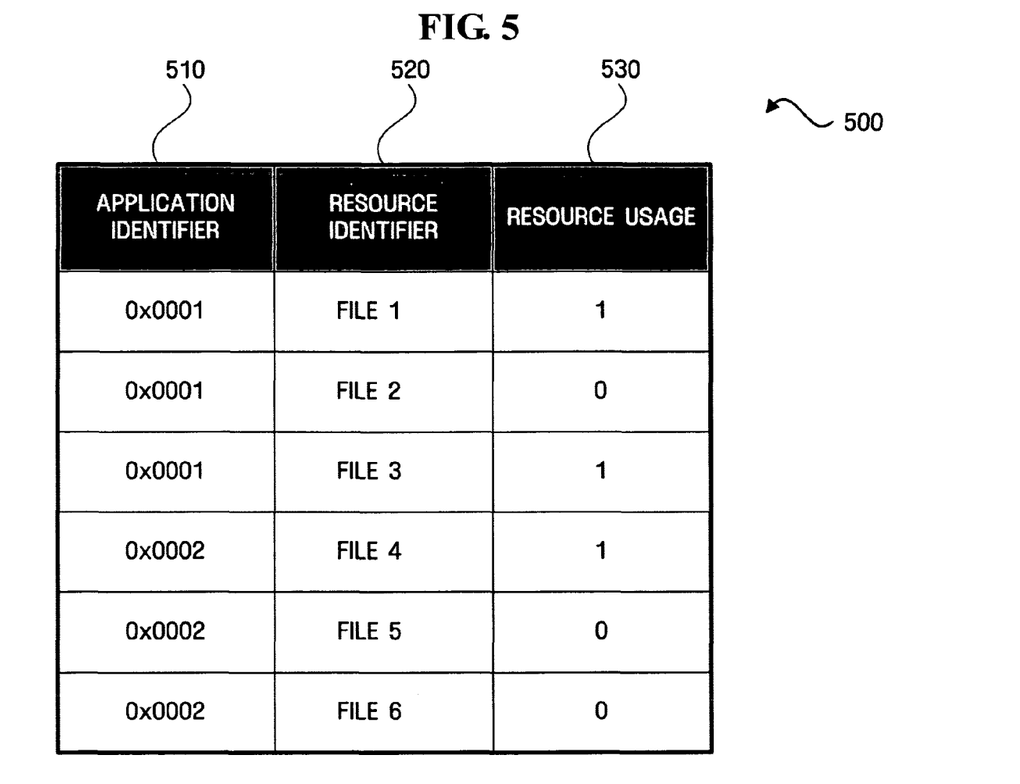
FIG. 5 is a view showing a resource table according to an exemplary embodiment of the invention.

FIG. 5 is a view showing a resource table according to an exemplary embodiment of the invention, more specifically, a file resource table. A resource table 500 includes an application identifier field 510, a resource identifier field 520, and a resource usage field 530.

The application identifier field 510 includes unique identifiers of applications. As described above, the application identifier may be generated using the thread identifier of the corresponding application, or it may be generated using the application registration order.

The resource identifier field 520 includes unique identifiers (resource identifiers) indicating the types of resources allocated to applications. Examples of resources may include memory resources, file resources, network resources, and other resources that can be allocated to and used in applications. Accordingly, a memory resource table, a file resource table, and a network resource table may be separately provided, or a combined table may be provided.

A plurality of resources may correspond to one application identifier, and a plurality of resources of the same type having different serial numbers may correspond to one application identifier. For example, a first file resource and a second file resource may correspond to one application identifier.

The resource usage field 530 includes flags each indicating whether the corresponding resource is used in the corresponding application. In other words, if an application uses the corresponding resource, 1 may be inserted to the corresponding flag, and if not, 0 may be inserted to the correspond flag.

The resource table 500 is generated and updated by the resource control unit 440. The resource control unit 440 updates the resource table 500 using the connection relationship between application identifiers and resources received from the application managing unit 410 and controls the application managing unit 450 to update the counters for the use of the corresponding resources.

Figure 6:
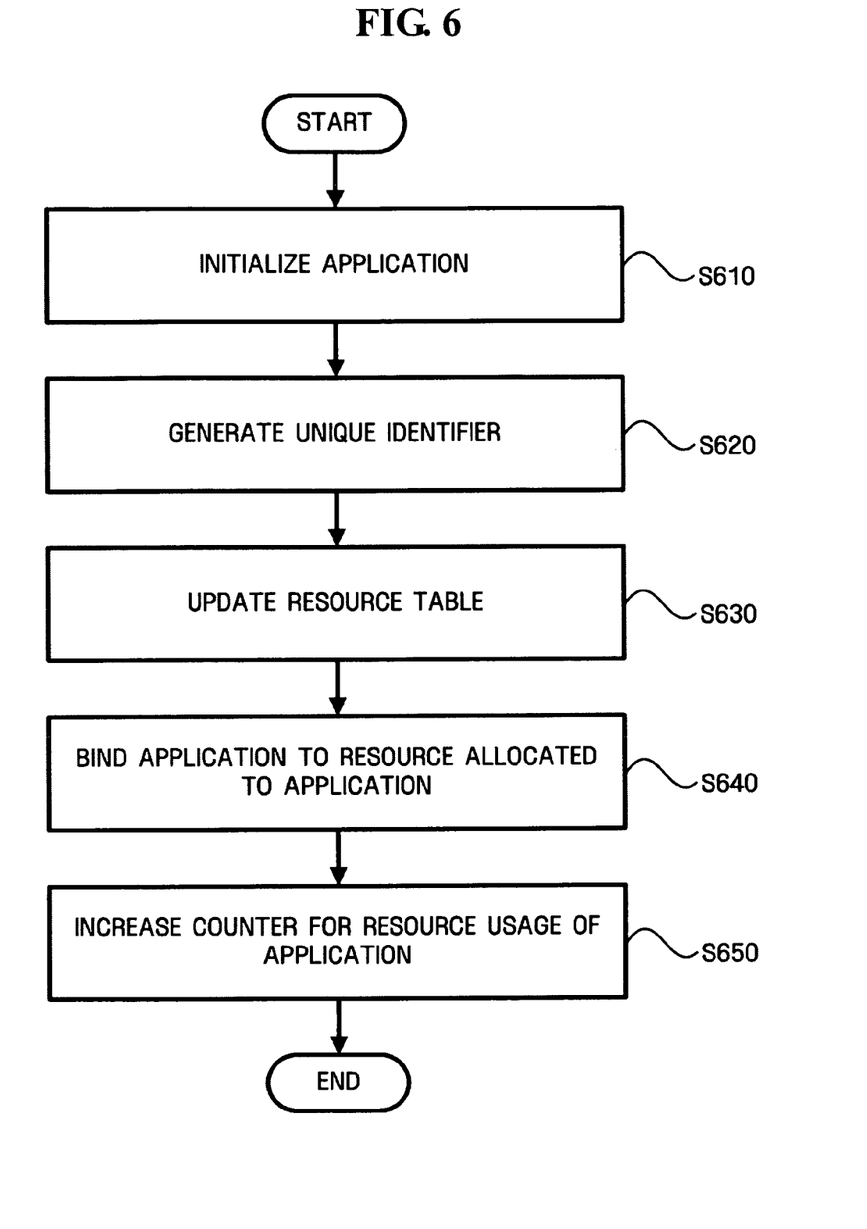
FIG. 6 is a flow chart showing procedures to use resources under a containment framework environment according to an exemplary embodiment of the invention.

FIG. 6 is a flow chart showing a process of using resources in a containment framework environment according to an exemplary embodiment of the invention.

In order to use resources in the containment framework environment, the application managing unit 410 of the resource managing apparatus 400 first initializes applications. That is, the application managing unit 410 checks the types and sizes of resources allocated to applications. When a plurality of applications are executed in the resource managing apparatus 400, the application managing unit 410 may initialize the individual applications (S610).

As the applications are initialized, the identifier generating unit 420 generates a unique identifier (application identifier) of the application to which a predetermined resource is allocated (S620). The resource may be at least one of a memory resource, a file resource, and a network resource. The applications executed in the resource managing apparatus 400 include at least one Java application having a life cycle.

The identifier generating unit 420 may generate the application identifier using the thread identifier of the application, or it may generate the application identifier using the registration order of the application. As the application identifier is generated, the resource control unit 440 stores the generated application identifier and the resource allocated to the corresponding application in the storage unit 430 such that they are associated with each other. In other words, the resource control unit 440 updates the resource table 500 (S630).

Then, the application managing unit 410 changes the state of the application. In other words, the application managing unit 410 binds the application to the resources allocated to the application by loading the initialized application in the memory and executing the paused application (S640). The result of the execution of the application is transferred to the resource control unit 440. Then, the resource control unit 440 sets the flag indicating whether the corresponding resource is used or not to 1 and transfers the result to the resource managing unit 450.

Accordingly, the resource managing unit 450 increases the counter for the resource usage of the corresponding application (S650). For example, when the corresponding resource is a file resource, a file resource managing unit (not shown) of the resource managing unit 450 increases a counter for the use of the file resource. When the corresponding resource is a network resource, a network resource managing unit (not shown) of the resource managing unit 450 increases a counter for the use of the network resource.

An increase in the counter for resource usage is performed as the application managing unit 410 changes the state of the application to an execution state, and counters for the use of resources allocated to a plurality of applications may increase at the same time.

Figure 7:
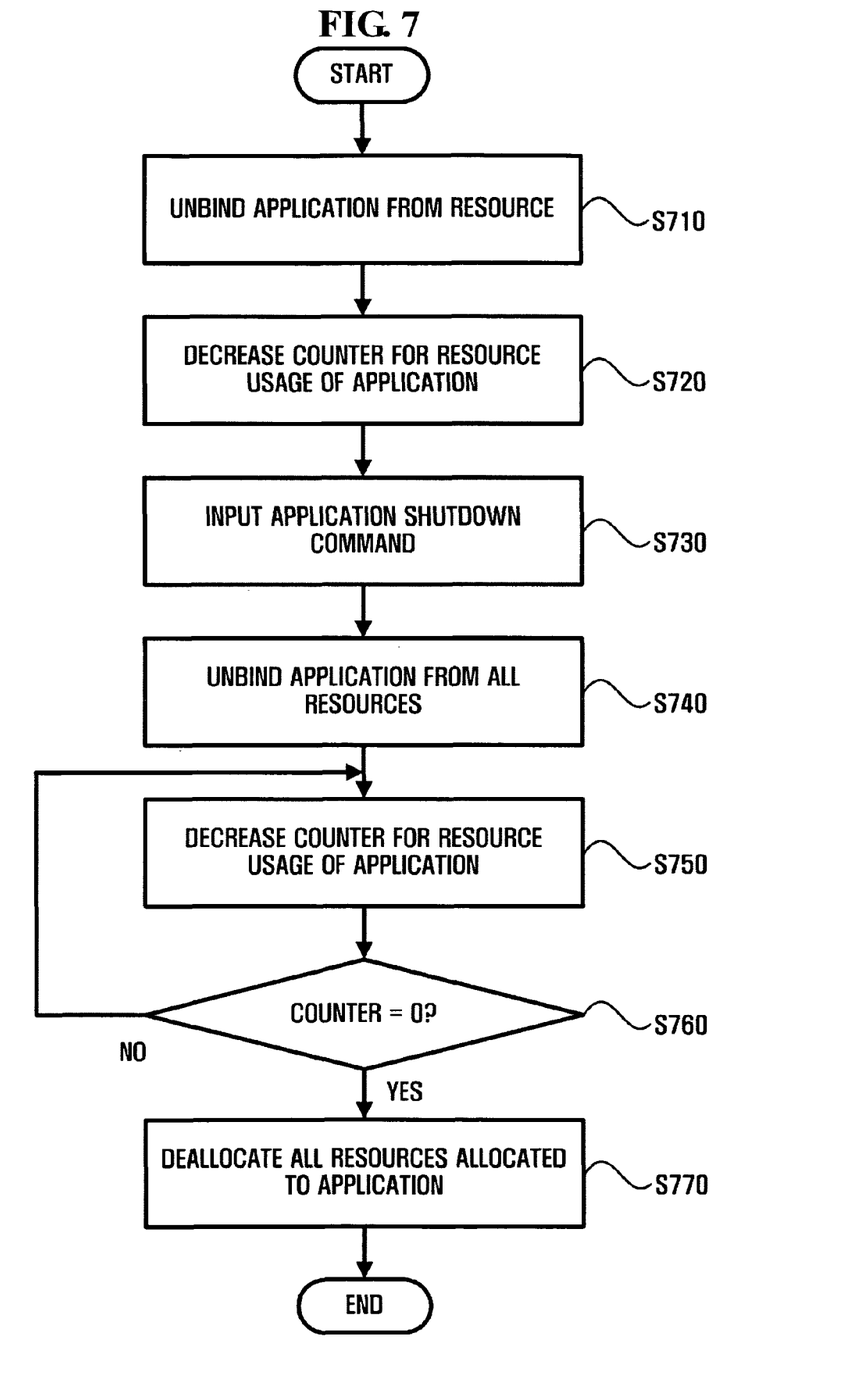
FIG. 7 is a flow chart showing procedures to de-allocate resources under a containment framework environment according to an exemplary embodiment of the invention.

FIG. 7 is a flow chart showing a process of de-allocating resources in a containment framework environment according to an exemplary embodiment of the invention.

In order to de-allocate resources in the containment framework environment, the application managing unit 410 of the resource managing apparatus 400 unbinds an application from a resource allocated to the application (S710). The result of unbinding is transferred to the resource control unit 440. Then, the resource control unit 440 sets the resource usage flag to 0 in the resource table 500 stored in the storage unit 430 and transfers the result to the resource managing unit 450.

Accordingly, the resource managing unit 450 decreases the counter for resource usage of the corresponding application (S720). For example, when the corresponding resource is a file resource, the file resource managing unit (not shown) of the resource managing unit 450 decreases the counter for file resource usage. When the corresponding resource is a network resource, the network resource managing unit (not shown) of the resource managing unit 450 decreases the counter for network resource usage.

Meanwhile, an application shutdown command may be input by a program code or a user (S730). When the application shutdown command is input, the application managing unit 410 changes the state of a corresponding application into a destroyed state and de-allocates all the resources allocated to the corresponding application (S740). The result of the de-allocation is transferred to the resource control unit 440. Then, the resource control unit 440 sets the flags of all the resources allocated to the corresponding application to 0 and transfers the result to the resource managing unit 450.

Accordingly, the resource managing unit 450 decreases the counters for the use of all the resources allocated to the corresponding application (S750). The result of the decrease in the counter is transferred to the resource control unit 440. Then, the resource control unit 440 checks whether the counter becomes 0 or not (S760). When the counter becomes 0, the resource control unit 440 transfers a resource de-allocation control code to the resource de-allocating unit 460.

When receiving the resource de-allocation control code, the resource de-allocating unit 460 de-allocates all the resources allocated to the corresponding application (S770). In the Java environment, a garbage collector may serve as the resource de-allocating unit 460 and forcibly de-allocate all the resources allocated to the corresponding application.

It will be understood that each block of the block diagram of FIG. 4, and combinations of steps in the flowcharts of FIGS. 6 and 7, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

Although the present invention has been described with reference to the accompanying drawings in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

As described above, according to the apparatus and method for managing resources in a containment framework environment, in the containment framework environment including a plurality of applications having life cycles, it is possible to prevent unnecessary usage of resources by managing resources on the whole frame work using information on resource allocation and resource de-allocation for each application.

What is claimed is:

1. An apparatus for managing resources in a containment framework environment, the apparatus comprising:
   a processor;
   an identifier generating unit which generates a unique identifier of an application to which a plurality of different types of resources are allocated within the containment framework environment;

an application managing unit which binds the plurality of different types of resources to the unique identifier or unbinds the plurality of different types of resources from the unique identifier;

a plurality of resource managing units each associated with a different type of the plurality of different types of resources and utilizing a processor which increases a counter for a use of a type of resource when a binding is established with the type of resource and decreases the counter for a use of the type of resource when the resource is unbound from the unique identifier;

a resource de-allocating unit which de-allocates a resource when the counter of the resource is 0; and a storage unit storing a table in which the unique identifier and the plurality of different types of resources are associated with each other, wherein the table comprises an application identifier comprising the unique identifier of the application, a resource identifier identifying, for each resource, a type of the resource from the plurality of different types of resources, and a resource usage flag for indicating, for each resource, the association between the unique identifier and the resource, wherein when the application is shut down, the resource de-allocating unit de-allocates all of the plurality of different types of resources allocated to the application, wherein the application comprises a Java application having a life cycle.

2. The apparatus of claim 1, wherein the plurality different types of resources comprise at least one of a memory resource, a file resource, and a network resource.

3. The apparatus of claim 1, wherein the identifier generating unit generates the unique identifier using a thread identifier of the application.

4. The apparatus of claim 1, further comprising a resource control unit which makes and updates the table.

5. The apparatus of claim 1, wherein when a plurality of applications exist, a resource control unit increases or decreases counters for resources allocated to each of the plurality of applications.

6. A method of managing resources in a containment framework environment for a computer system, the method comprising:

generating a unique identifier of an application to which a plurality of different types of resources are allocated within the containment framework environment;

binding the plurality of different types of resources to the unique identifier or unbinding the plurality of different types of resources from the unique identifier;

utilizing a processor for increasing a counter for a use of a type of resource when a binding is established with the type of resource and decreasing the counter for a use of the type of resource when the resource is unbound from the unique identifier, wherein the processor is utilized for increasing and decreasing the counter by a plurality of resource managing units each associated with a different type of the plurality of different types of resources;

storing a table in which the unique identifier and the plurality of different types of resources are associated with each other, wherein the table comprises an application identifier comprising the unique identifier of the application, a resource identifier identifying, for each resource, a type of the resource from the plurality of different types of resources, and a resource usage flag for indicating, for each resource, the association between the unique identifier and the resource, and de-allocating a resource when the counter of the resource is 0, wherein the de-allocating of the resource comprises de-allocating all of the plurality of different types of resources allocated to the application when the application is shut down, wherein the application comprises a Java application having a life cycle.

7. The method of claim 6, wherein the plurality different types of resources comprise at least one of a memory resource, a file resource, and a network resource.

8. The method of claim 6, wherein the generating of the unique identifier comprises generating the unique identifier using a thread identifier of the application.

9. The method of claim 6, further comprising making and updating the table.

10. The method of claim 6, wherein the increasing or decreasing the counter comprises increasing or decreasing counters for resources allocated to each of a plurality of applications.

11. The method of claim 6, wherein the de-allocating the resource when the counter is 0 further comprises:

transferring a resource de-allocation control code to a resource de-allocating unit; and de-allocating all resources allocated to the application.

* * * * *